United States Patent
Kim et al.

(10) Patent No.: US 9,456,223 B2
(45) Date of Patent: Sep. 27, 2016

(54) LOCAL ILLUMINATION AND COLOR COMPENSATION WITHOUT EXPLICIT SIGNALING

(75) Inventors: Jae Hoon Kim, Los Angeles, CA (US); Yeping Su, Camas, WA (US); Peng Yin, West Windsor, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 1653 days.

(21) Appl. No.: 12/311,929

(22) PCT Filed: Oct. 11, 2007

(86) PCT No.: PCT/US2007/021803
§ 371 (c)(1),
(2), (4) Date: Apr. 17, 2009

(87) PCT Pub. No.: WO2008/048487
PCT Pub. Date: Apr. 24, 2008

(65) Prior Publication Data
US 2009/0257669 A1 Oct. 15, 2009

Related U.S. Application Data

(60) Provisional application No. 60/852,530, filed on Oct. 18, 2006.

(51) Int. Cl.
*G06K 9/36* (2006.01)
*H04N 19/85* (2014.01)
(Continued)

(52) U.S. Cl.
CPC ............ *H04N 19/85* (2014.11); *H04N 19/103* (2014.11); *H04N 19/176* (2014.11);
(Continued)

(58) Field of Classification Search
None
See application file for complete search history.

(56) References Cited

U.S. PATENT DOCUMENTS 5,886,736 A * 3/1999 Chen ................................ 348/43
6,549,650 B1 4/2003 Ishikawa et al.
(Continued)

FOREIGN PATENT DOCUMENTS

JP 2009-502691 1/2009

OTHER PUBLICATIONS

Choi et al., "Face Recognition Using Energy Probability in DCT Domain," Multimedia and Expo, 2006 IEEE Int'l. Conference in PI, Jul. 1, 2006, pp. 1549-1552, XP031033144.
(Continued)

*Primary Examiner* — Eueng-Nan Yeh
(74) *Attorney, Agent, or Firm* — Robert D. Shedd

(57) ABSTRACT

There are provided method and apparatus for local illumination and color compensation without explicit signaling. An apparatus includes an encoder for encoding a picture by enabling at least one of color compensation and illumination compensation of at least one color component of a prediction for an image block of the picture without using explicit signaling. The method comprises at least the step of enabling the encoding of a picture described above in the apparatus, again without use of explicit signaling. In the description of an specific embodiment, this enabling of the color compensation and the illumination compensation is based on at least one of a group of pixels and a local signal block corresponding to the picture. Similar descriptions are provided for a method and apparatus for decoding the signal the encoded signal. There are provided method and apparatus for local illumination and color compensation without explicit signaling. An apparatus includes an encoder for encoding a picture by enabling at least one of color compensation and illumination compensation of at least one color component of a prediction for an image block of the picture without using explicit signaling. The method comprises at least the step of enabling the encoding of a picture described above in the apparatus, again without use of explicit signaling. In the description of an specific embodiment, this enabling of the color compensation and the illumination compensation is based on at least one of a group of pixels and a local signal block corresponding to the picture. Similar descriptions are provided for a method and apparatus for decoding the signal the encoded signal.

30 Claims, 4 Drawing Sheets

(51) Int. Cl.

| | | |
|---|---|---|
| *H04N 19/597* | (2014.01) | |
| *H04N 19/176* | (2014.01) | |
| *H04N 19/70* | (2014.01) | |
| *H04N 19/46* | (2014.01) | |
| *H04N 19/196* | (2014.01) | |
| *H04N 19/61* | (2014.01) | |
| *H04N 19/103* | (2014.01) | |
| *H04N 19/463* | (2014.01) | |
| *H04N 19/186* | (2014.01) | |

(52) U.S. Cl.
CPC ......... *H04N 19/186* (2014.11); *H04N 19/196* (2014.11); *H04N 19/46* (2014.11); *H04N 19/463* (2014.11); *H04N 19/597* (2014.11); *H04N 19/61* (2014.11); *H04N 19/70* (2014.11)

(56) References Cited

U.S. PATENT DOCUMENTS

| | | | |
|---|---|---|---|
| 7,404,645 B2* | 7/2008 | Margulis ..................... | 353/31 |
| 7,680,185 B2* | 3/2010 | Mukerjee et al. ....... | 375/240.15 |
| 7,852,936 B2* | 12/2010 | Mukerjee et al. ....... | 375/240.15 |
| 8,047,333 B2 | 11/2011 | Finschi | |
| 2005/0013363 A1* | 1/2005 | Cho et al. ................. | 375/240.12 |
| 2007/0030898 A1 | 2/2007 | Cote | |
| 2007/0109409 A1 | 5/2007 | Yea et al. | |
| 2007/0110153 A1 | 5/2007 | Cho et al. | |
| 2007/0177672 A1* | 8/2007 | Yang ................... | H04N 19/597 375/240.25 |

OTHER PUBLICATIONS

Feng et al., "JPEG compressed image retrieval via statistical features," Pattern Recognition, Elsevier, GB, vol. 36, No. 4, Apr. 1, 2002, pp. 977-985, XP004398636.

Kim et al., "Illumination Compensation for Multi-View Video Coding," Preliminary results on MVC CE-2, Video Standards and Drafts, MPEG2006/M13317, Mar. 30, 2006, XP030041986.

Kim et al., "Results of CE2 on Multi-view Video Coding," JVT-T117, ISO/IEC MPEG & ITU-T VCEG 20$^{th}$ Meeting: Klagenfurt, Austria, Jul. 15-21, 2006, 8 pages.

Lee et al., "Results of CE2 on Multi-view Video Coding," JVT-T110, ISO/IEC MPEG & ITU-T VCEG 20$^{th}$ Meeting: Klagenfurt, Austria, Jul. 15-21, 2006, 26 pages.

Yang, "Results of CE2 on Multiview Video Coding," JVT-T115, ISO/IEC MPEG & ITU-T VCEG 20$^{th}$ Meeting: Klagenfurt, Austria, Jul. 15-21, 2006, 9 pages, XP030006602.

Yin et al., "Localized Weighted Prediction for Video Coding," Circuits and Systems, ISCAS 2005, IEEE Int'l. Symposium in Kobe, Japan, May 23-26, 2005, pp. 4365-4368, XP010816640.

ITU-T Recommendation H.264, "Advanced video coding for generic audiovisual services," Series H: Audiovisual and Multimedia Systems, Infrastructure of audiovisual services—Coding of moving video, Mar. 2005, 325 pages.

International Search Report, dated Oct. 30, 2008.

Liu, D. et al, "Linear transform based motion compensated prediction for luminance intensity changes", Circuits and Systems, 2005, IEEE International Symposium, pp. 304-307, Issued: May 23-26, 2005.

* cited by examiner

LOCAL ILLUMINATION AND COLOR COMPENSATION WITHOUT EXPLICIT SIGNALING

CROSS-REFERENCE TO RELATED APPLICATIONS

This application claims the benefit, under 35 U.S.C. §365 of International Application PCT/US2007/021803 filed Oct. 11, 2007, which was published in accordance with PCT Article 21(2) on Apr. 24, 2008 in English and which claims the benefit of U.S. provisional patent application No. 60/852,530 filed Oct. 18, 2006. Furthermore, this application is closely related in disclosed subject matter to a concurrently filed National Stage application (U.S. patent application Ser. No. 12/311,918 filed Apr. 17, 2009) having the same title which application claims the benefit, under 35 U.S.C. §365 of International Application PCT/US2007/021812 filed Oct. 11, 2007, which was published in accordance with PCT Article 21(2) on Apr. 24, 2008 in English and which also claims the benefit of U.S. provisional patent application No. 60/852,530 filed Oct. 18, 2006.

TECHNICAL FIELD

The present principles relate generally to video encoding and decoding and, more particularly, to methods and apparatus for local illumination and color compensation without explicit signaling.

BACKGROUND

It has been widely recognized that Multi-view Video Coding (MVC) is a technology that serves a wide variety of applications including, for example, free-viewpoint and 3D video applications, home entertainment and surveillance. In those multi-view applications, the amount of video data involved is typically very large. Thus, there exists the need for efficient compression technologies to improve the coding efficiency of current video coding solutions performing simulcast of independent views.

Since a multi-view video source includes multiple views of the same scene, there exists a high degree of correlation between the multiple view images. Therefore, view redundancy can be exploited in addition to temporal redundancy and is achieved by performing view prediction across the different views.

In a practical scenario, multi-view video systems involving a large number of cameras will be built using heterogeneous cameras, or cameras that have not been perfectly calibrated. This leads to differences in luminance and chrominance when the same parts of a scene are viewed with different cameras. Moreover, camera distance and positioning also affects illumination, in the sense that the same surface may reflect the light differently when perceived from different angles. Under these scenarios, luminance and chrominance differences will decrease the efficiency of cross-view prediction.

Several approaches have been proposed for solving the illumination mismatch problem between pairs of images. In one such approach, hereinafter referred to as the first prior art approach, a scale/offset parameter for a 16×16 macroblock and predictive coding of these parameters may be used. Also, in the first prior approach, a rate-distortion cost based enabling switch may be used. However, the first prior art approach focuses on temporal video sequences. In video sequences, the illumination mismatch problem does not typically occur consistently as in cross-view prediction. In other prior art approaches, local illumination compensation methods for multi-view video coding are proposed, such as, for example, an approach in which an offset for each signal block is predictive coded and signaled in order to compensate the illumination differences in cross-view prediction.

May prior art approaches to illumination compensation use signaling bits to achieve illumination compensation. The signaled information will be able to better represent illumination mismatches, but the extra overhead in sending that information will penalize the benefit of gaining better prediction.

SUMMARY

These and other drawbacks and disadvantages of the prior art are addressed by the present principles, which are directed to methods and apparatus for local illumination and color compensation without explicit signaling.

According to an aspect of the present principles, there is provided an apparatus. The apparatus includes an encoder for encoding a picture by enabling at least one of color compensation and illumination compensation of at least one color component of a prediction for an image block of the picture without using explicit signaling.

According to another aspect of the present principles, there is provided a method. The method includes encoding a picture by enabling at least one of color compensation and illumination compensation of at least one color component of a prediction for an image block of the picture without using explicit signaling.

According to still another aspect of the present principles, there is provided an apparatus. The apparatus includes a decoder for decoding a picture by enabling at least one of color compensation and illumination compensation of at least one color component of a prediction for an image block of the picture without receipt of any explicit signaling corresponding thereto.

According to a still further aspect of the present principles, there is provided a method. The method includes encoding a picture by enabling at least one of color compensation and illumination compensation of at least one color component of a prediction for an image block of the picture without receipt of any explicit signaling corresponding thereto.

According to a yet further aspect of the present principles, there is provided an apparatus. The apparatus includes an encoder for encoding a picture by deriving at least one of illumination compensation information and color compensation information for a region in the picture based on illumination information and color information from one or more other regions in at least one of the picture and one or more related pictures.

According to an additional aspect of the present principles, there is provided a method. The method includes encoding a picture by deriving at least one of illumination compensation information and color compensation information for a region in the picture based on illumination information and color information from one or more other regions in at least one of the picture and one or more related pictures.

According to a further additional aspect of the present principles, there is provided an apparatus. The apparatus includes a decoder for decoding a picture by deriving at least one of illumination compensation information and color compensation information for a region in the picture based on illumination information and color information from one or more other regions in at least one of the picture and one or more related pictures.

According to a yet further additional aspect of the present principles, there is provided a method. The method includes decoding a picture by deriving at least one of illumination compensation information and color compensation information for a region in the picture based on illumination information and color information from one or more other regions in at least one of the picture and one or more related pictures.

According to a still further aspect of the present principles, there is provided an apparatus. The apparatus includes an encoder for encoding a picture by selectively determining whether to implicitly signal an enablement of at least one of illumination compensation and color compensation for at least one color component of a prediction for an image block of the picture.

According to a yet further aspect of the present principles, there is provided a method. The method includes encoding a picture by selectively determining whether to implicitly signal an enablement of at least one of illumination compensation and color compensation for at least one color component of a prediction for an image block of the picture.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which.

DETAILED DESCRIPTION

Figure 1:
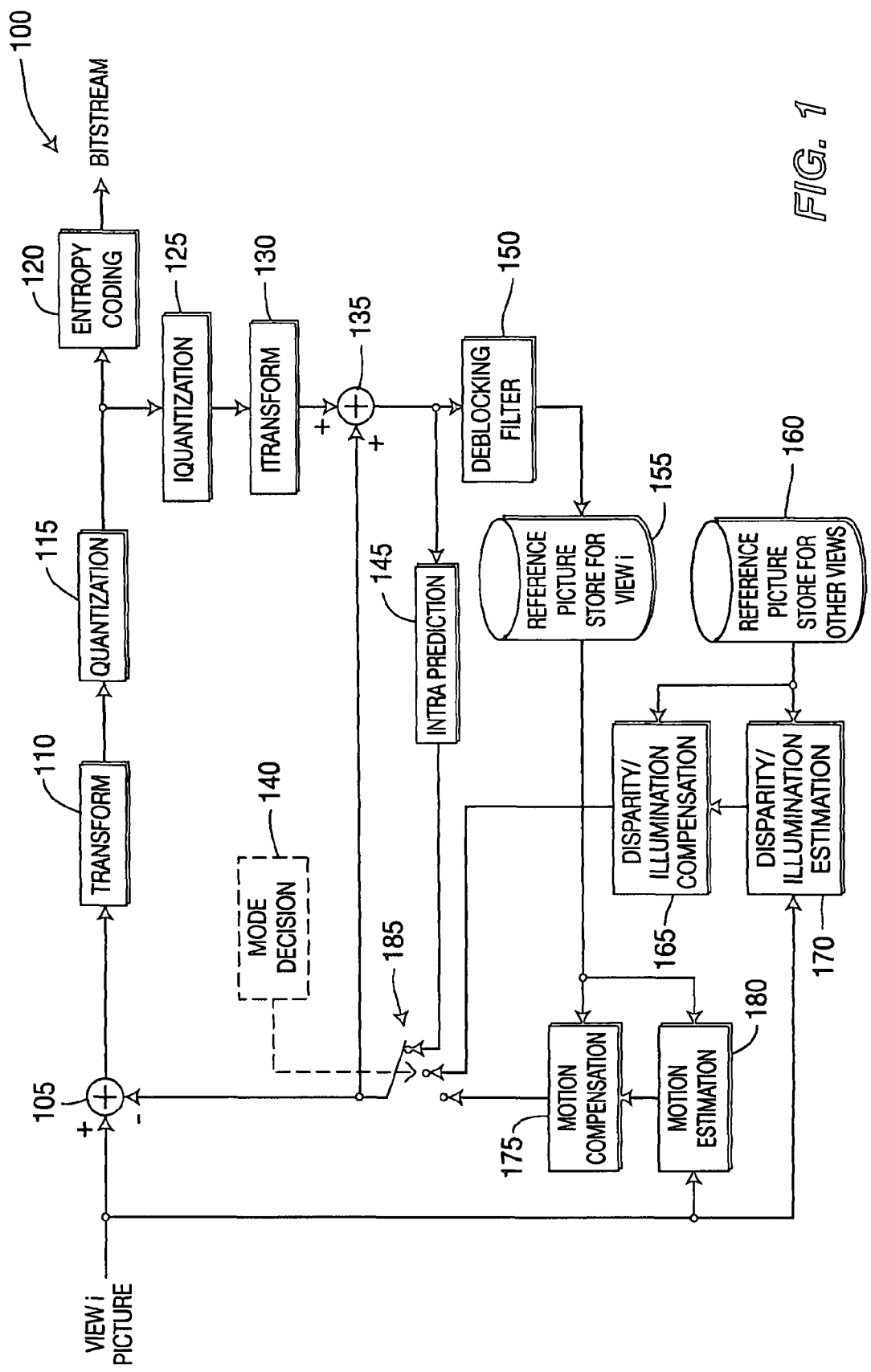
FIG. 1 is a block diagram for an exemplary Multi-view Video Coding (MVC) encoder to which the present principles may be applied, in accordance with an embodiment of the present principles.

The present principles are directed to methods and apparatus for local illumination and color compensation without explicit signaling.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles means that a particular feature, structure, characteristic, and so forth described in connection with the embodiment is included in at least one embodiment of the present principles. Thus, the appearances of the phrase "in one embodiment" or "in an embodiment" appearing in various places throughout the specification are not necessarily all referring to the same embodiment.

The phrase "multi-view video sequence" refers to a set of two or more video sequences that capture the same scene from different view points.

The phrases "cross-view" and "inter-view" are interchangeably used herein to both refer to pictures that belong to a view other than a current view.

It is to be appreciated that the use of the term "and/or", for example, in the case of "A and/or B", is intended to encompass the selection of the first listed option (A), the selection of the second listed option (B), or the selection of both options (A and B). As a further example, in the case of "A, B, and/or C", such phrasing is intended to encompass the selection of the first listed option (A), the selection of the second listed option (B), the selection of the third listed option (C), the selection of the first and the second listed options (A and B), the selection of the first and third listed options (A and C), the selection of the second and third listed options (B and C), or the selection of all three options (A and B and C). This may be extended, as readily apparent by one of ordinary skill in this and related arts, for as many items listed.

Moreover, it is to be appreciated that while one or more embodiments of the present principles are described herein with respect to the MPEG-4 AVC standard, the present principles are not limited to solely this standard and, thus, may be utilized with respect to other video coding standards, recommendations, and extensions thereof, including extensions such as multi-view (and non-multi-view) extensions of the MPEG-4 AVC standard, while maintaining the spirit of the present principles.

Also, it is to be appreciated that while one or more embodiments of the present principles are described herein with respect to be applied to a Multi-view Video Coding (MVC) extension of the MPEG-4 AVC Standard, for which motion compensation and disparity compensation are enabled, the present principles are not limited to solely the preceding and, thus, may be utilized with respect to any Multi-view video Coding scheme for which disparity compensation is enabled.

Additionally, it is to be appreciated that the present principles may be advantageously applied to video processing in addition to and/or in place of video compression and/or video decompression. For example, the present principles may be readily used with any video processor and/or video processing that involves illumination and/or color compensation.

Further, it is to be appreciated that the present principles may be advantageously applied to image registration and camera calibration. These and other applications of the present principles are readily determined by one of ordinary skill in this and related arts, given the teachings of the present principles provided herein.

Moreover, it is to be appreciated that the present principles may be applied with respect to illumination and/or color compensation.

Further, it is to be appreciated that the present principles may be used with respect to multi-view and single-view video coding and decoding (e.g., temporal prediction in single-view video coding).

As used herein, the phrase "related pictures" refers to temporal reference pictures and/or cross-view reference pictures.

Moreover, as used herein, the phrase "local signal block" refers to a spatial neighboring block, and/or a view/temporal co-located/neighboring block.

Also, while the proposed illumination and/or color compensation approaches are described primarily with respect to an offset for each signal block, such approaches may be readily extended to include a scale factor and/or a combination of an offset and scaling, as is readily apparent to one of ordinary skill in this and related arts, while maintaining the spirit of the present principles.

Turning to FIG. 1, an exemplary Multi-view Video Coding (MVC) encoder to which the present principles may be applied is indicated generally by the reference numeral 100. The encoder 100 includes a combiner 105 having an output connected in signal communication with an input of a transformer 110. An output of the transformer 110 is connected in signal communication with an input of quantizer 115. An output of the quantizer 115 is connected in signal communication with an input of an entropy coder 120 and an input of an inverse quantizer 125. An output of the inverse quantizer 125 is connected in signal communication with an input of an inverse transformer 130. An output of the inverse transformer 130 is connected in signal communication with a first non-inverting input of a combiner 135. An output of the combiner 135 is connected in signal communication with an input of an intra predictor 145 and an input of a deblocking filter 150. An output of the deblocking filter 150 is connected in signal communication with an input of a reference picture store 155 (for view i). An output of the reference picture store 155 is connected in signal communication with a first input of a motion compensator 175 and a first input of a motion estimator 180. An output of the motion estimator 180 is connected in signal communication with a second input of the motion compensator 175

An output of a reference picture store 160 (for other views) is connected in signal communication with a first input of a disparity/illumination estimator 170 and a first input of a disparity/illumination compensator 165. An output of the disparity/illumination estimator 170 is connected in signal communication with a second input of the disparity/illumination compensator 165.

An output of the entropy encoder 120 is available as an output of the encoder 100. A non-inverting input of the combiner 105 is available as an input of the encoder 100, and is connected in signal communication with a second input of the disparity/illumination estimator 170, and a second input of the motion estimator 180. An output of a switch 185 is connected in signal communication with a second non-inverting input of the combiner 135 and with an inverting input of the combiner 105. The switch 185 includes a first input connected in signal communication with an output of the motion compensator 175, a second input connected in signal communication with an output of the disparity/illumination compensator 165, and a third input connected in signal communication with an output of the intra predictor 145.

A mode decision module 140 has an output connected to the switch 185 for controlling which input is selected by the switch 185.

Figure 2:
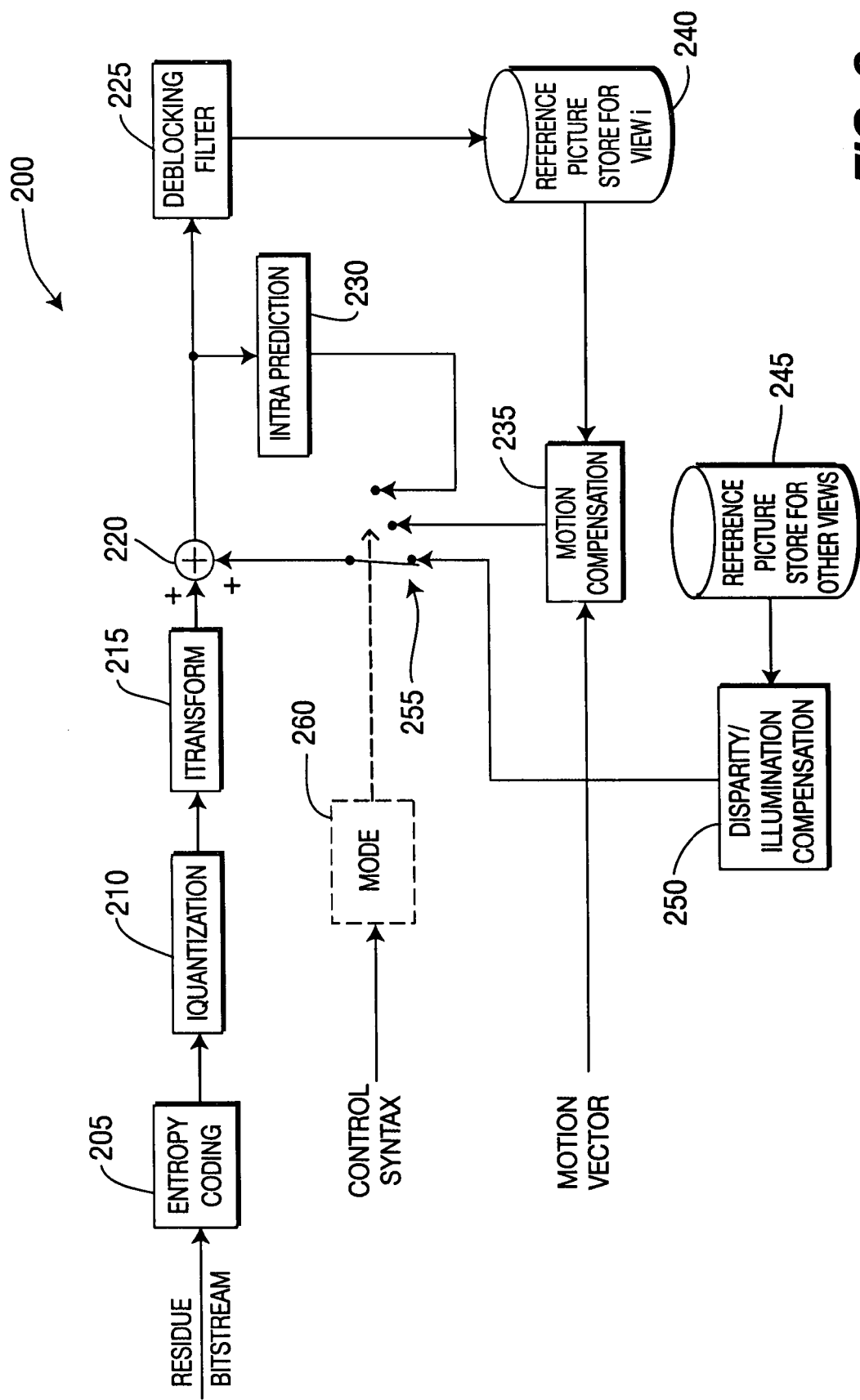
FIG. 2 is a block diagram for an exemplary Multi-view Video Coding (MVC) decoder to which the present principles may be applied, in accordance with an embodiment of the present principles.

Turning to FIG. 2, an exemplary Multi-view Video Coding (MVC) decoder to which the present principles may be applied is indicated generally by the reference numeral 200. The decoder 200 includes an entropy decoder 205 having an output connected in signal communication with an Input of an inverse quantizer 210. An output of the inverse quantizer is connected in signal communication with an input of an inverse transformer 215. An output of the inverse transformer 215 is connected in signal communication with a first non-inverting input of a combiner 220. An output of the combiner 220 is connected in signal communication with an input of a deblocking filter 225 and an input of an intra predictor 230. An output of the deblocking filter 225 is connected in signal communication with an input of a reference picture store 240 (for view i). An output of the reference picture store 240 is connected in signal communication with a first input of a motion compensator 235.

An output of a reference picture store 245 (for other views) is connected in signal communication with a first input of a disparity/illumination compensator 250.

An input of the entropy decoder 205 is available as an input to the decoder 200, for receiving a residue bitstream. Moreover, an input of a mode module 260 is also available as an input to the decoder 200, for receiving control syntax to control which input is selected by the switch 255. Further, a second input of the motion compensator 235 is available as an input of the decoder 200, for receiving motion vectors. Also, a second input of the disparity/illumination compensator 250 is available as an input to the decoder 200, for receiving disparity vectors and illumination compensation syntax.

An output of a switch 255 is connected in signal communication with a second non-inverting input of the combiner 220. A first input of the switch 255 is connected in signal communication with an output of the disparity/illumination compensator 250. A second input of the switch 255 is connected in signal communication with an output of the motion compensator 235. A third input of the switch 255 is connected in signal communication with an output of the intra predictor 230. An output of the mode module 260 is connected in signal communication with the switch 255 for controlling which input is selected by the switch 255. An output of the deblocking filter 225 is available as an output of the decoder 200.

As noted above, the present principles are directed to a method and apparatus for local illumination and color compensation without explicit signaling. The present principles may be used with respect to multi-view and single-view video sequences. Moreover, the present principles may be implemented In an embodiment, "implicit" illumination and/or color compensation can be carried out for the local signals based on causally available neighboring information without explicitly signaling any extra information.

A problem addressed by at least one embodiment is the efficient coding of multi-view video sequences. As noted above, a multi-view video sequence is a set of two or more video sequences that capture the same scene from different view points.

In an illustrative embodiment of the present principles involving illumination compensation and/or color compensation, directed to the Multi-view Video Coding (MVC) extension of the MPEG-4 AVC standard, an exemplary framework is set forth as follows. At the slice level, new syntax elements (ic_prediction_flag and/or cc_prediction_flag) are introduced to indicate whether illumination compensation and color compensation are respectively enabled for the current slice. At the macroblock-level, new syntax elements are introduced: ic_enable and/or cc_enable are introduced to indicate the utilization of illumination compensation and color compensation, respectively, for each block; and ic_sym and/or cc_sym are introduced to convey the illumination offset parameter and color offset parameter, respectively. In summary, ic_enable and/or cc_enable, ic_sym, and/or cc_sym are the new syntax elements that we need to signal for illumination and color compensation.

Thus, in an embodiment, we propose methods to enable illumination compensation and/or color compensation without the need to signal any illumination and/or color compensation specific information in the prediction process of the local signal, i.e., we do not need to send syntax elements for ic_enable and/or cc_enable, ic_sym, and/or cc_sym. Those elements are derived using our invention.

In an embodiment, the illumination and/or color compensation is fully integrated with the variable block size functionalities in the MPEG-4 AVC Standard.

Illumination Compensation as Part of the Cross-View Prediction Process

In an embodiment involving a coding application, illumination compensation will be considered as part of the disparity compensation process. In this scenario, cross-view prediction typically involves the computation of a disparity field between pictures from different views. The disparity field in cross-view prediction may be considered to be analogous to what the motion field is in temporal prediction. For the sake of simplicity, we will presume in the following that cross-view prediction, and by extension disparity estimation, is performed on a block basis. The extension of the disclosed methods, features, and aspects to other groups of samples will be straight forward to those of ordinary skill in this and related arts. Such other groups of samples include, for example, a single pixel, a block having more than one pixel, a frame, a picture, and so forth.

When illumination compensation is used in the disparity compensation of a block, the illumination compensated reference block is calculated as follows:

$$B_r(x,y)=R(x+\Delta x, y+\Delta y)+ic\_\text{offset}$$

where R(x,y) is the cross-view reference picture, and (Δx, Δy) is the disparity vector (DV). ic_offset is the amount of offset applied to the reference block in order to address the mismatch between the current signal and the reference signal.

Local Illumination Compensation Without Explicit Signaling

Presuming that one or more embodiments of the present principles are applied to a Multi-view Video Coding (MVC) extension of the MPEG-4 AVC Standard, we can perform illumination compensation (IC) and/or color compensation (CC) without explicitly signaling any illumination compensation specific or color compensation specific information. This can be achieved, for example, by utilizing the signal statistics in a temporal, view, and/or spatial neighborhood around the current signal, which is causally available (for example, which has been decoded) at the decoder side. Usually signal statistics are highly correlated in a temporal, view, and/or spatial neighborhood, and this characteristic can be utilized to derive the illumination compensation and/or color compensation information for the current signal without explicit signaling. In particular, we use illumination compensation offsets as an example of signal statistics in the following illustrations, and the illumination compensation information includes whether to enable IC and the amount of IC to apply. Of course, the same applies to color compensation, which is not described partly herein for the sake of brevity.

In an embodiment, one possibility for using illumination compensation as an example of signal statistics is to use the previously processed/decoded illumination compensation offsets in the spatially neighboring blocks. The spatially neighboring blocks may also be from other views, or from temporally-different pictures (same view or a different view). Whether to enable illumination compensation and the amount of illumination compensation used for the current block can be derived from the neighboring illumination compensation offsets by averaging, median filtering, and/or other types of filtering. Note that the filtering may be, for example, linear or non-linear.

In another embodiment, another possibility for using illumination compensation as an example of signal statistics is to use the processed/decoded illumination compensation offsets in the co-located signal blocks in previously processed/decoded pictures (temporally different pictures). Whether to enable illumination compensation and the amount of illumination compensation used for the current block can then be derived from those co-located illumination compensation offsets by averaging, median filtering, and/or other types of filtering. The co-located signal block (as with the spatially neighboring blocks from above) can be from a previously processed/decoded picture in the same view; or from a previously processed/decoded picture in other views. Also, conceivably the signal position from where the illumination compensation offsets are derived can be specified by a displacement vector. The displacement vector can either be signaled or derived from spatial neighbors, and with this displacement vector a better correlated signal may be located in the picture to where it points.

Blocks (co-located, spatially neighboring, and/or otherwise) may be used from current pictures in other view and even from future (temporally advanced) pictures. However, such implementations may introduce additional processing and/or delays.

Since there is no explicit signaling for illumination compensation syntax, the proposed implicit illumination compensation method can be combined with existing Skip and/or Direct modes in the MPEG-4 AVC Standard or any extension thereof. For Skip and Direct modes, the illumination compensation offset as well as motion information can be derived and then used to reconstruct the current signal. The ability to derive illumination compensation information without signaling overhead is very efficient in terms of compression efficiency. In addition to this implicit illumination compensation mode, the derived illumination compensation information from temporal, view, and/or spatial neighbors can be used as a predictor in predictive coding of illumination compensation parameters in explicit illumination compensation mode.

In an embodiment directed to the MPEG-4 AVC Standard, the derivation processes of illumination compensation for macroblock-based Skip mode and Direct modes are illustrated as follows:

For P skip mode, whether illumination compensation is enabled (ic_flag) for the current macroblock and the amount of illumination compensation applied (ic_offset) are derived from neighboring macroblocks. The syntax ic_flag is set to 1 if illumination compensation is enabled for either the upper macroblock or the left macroblock, and conversely ic_flag is set to 0 if illumination compensation is enabled for neither the upper macroblock nor the left macroblock. The average value of ic_offset from the upper and left macroblocks is used as the illumination compensation parameter of the current macroblock if both neighboring macroblocks use illumination compensation. If only one neighboring macroblock uses illumination compensation, the ic_offset of that macroblock is used for the current macroblock. Mathematically, the illumination compensation process can be expressed as:

$$B_r(x,y)=R(x+\Delta x,y+\Delta y)+ic\_flag?ic\_offset:0$$

where both ic_flag and ic_offset are derived from neighboring macroblocks without explicit signaling.

The same principle can essentially be applied to Direct modes in B_SLICE also. For both Direct_16×16 and Direct_8×8 modes in B_SLICE, ic_flag and ic_offset are derived from neighboring decoded signal blocks.

It is to be appreciated that other embodiments can be carried out in the transform domain. More specifically, in an embodiment, the illumination compensation offset in the pixel domain is equivalent to the Discrete Cosine (DC) coefficient in the transform domain. The proposed implicit illumination compensation methods can then be carried out as follows:

(Step 1) The amount of IC of the neighboring blocks is extracted from their respective DC coefficients in the transform domain;

(Step 2) Whether to enable illumination compensation and the amount of illumination compensation used for the current block can then be derived from the information obtained in step 1;

(Step 3) The illumination compensation process for the current block can be carried out in the transform domain using the result of step 2.

It is to be appreciated that the transform domain based approach can be combined with the pixel-domain based approach. For example, in a particular design, step (3) can be carried out in the pixel domain, but step (1) can be performed in the transform domain.

It is to be appreciated that for Skip and Direct modes with derived illumination compensation information, the motion vectors are derived and, thus, there is no illumination compensation adaptive motion estimation involved at the encoder side. For these modes, the derived illumination compensation information is applied to the reference block pointed to by the derived motion vector.

In an MPEG-4 AVC Standard based embodiment, the existence of multiple reference pictures can be taken into account in the proposed implicit illumination compensation methods. For example, in order to utilize the most correlated illumination compensation information, the derivation of illumination compensation offsets can be restricted, for example, to neighboring blocks that are predicted from the same reference picture, or to blocks that are predicted from one of multiple reference pictures that are considered to be similar according to some metric. Alternatively, all blocks can be utilized (in some neighborhood, for example) regardless of which reference picture from which the block is predicted. Moreover, we can optionally apply the same rules that describe how multiple reference pictures are considered for motion vector prediction.

The MPEG-4 AVC Standard supports variable block size motion compensation, with block sizes ranging from 16×16 to 4×4. The proposed implicit illumination compensation methods can be applied to one or more block sizes, depending on the nature of the illumination changes in the signal and the encoder/decoder complexity allowed.

Also, the degree of illumination mismatch varies from one image to another. Thus, it might not be efficient to always enable the proposed implicit illumination compensation methods. To serve that purpose, sequence/picture/slice level syntaxes can be signaled to indicate whether the proposed implicit illumination compensation method is utilized for the sequence/picture/slice.

An Encoder Design for the Proposed Implicit IC Methods

A description of an embodiment of an encoding method is provided to better illustrate how the proposed implicit illumination compensation methods can be used. Of course, the present principles are not limited to this encoding method and, given the teachings of the present principles provided herein, one of ordinary skill in this and related arts will contemplate these and other encoding methods and variations thereof, while maintaining the spirit of the present principles. Presuming we are currently coding block_i, and there exists several neighboring blocks that enable illumination compensation, each with an IC offset of ic_offset_j.

The offsets may be calculated, for example, as the average, over all pixels in a block, of the difference between the pixels in the block and the corresponding pixels in the corresponding block of the reference picture. The encoder has the flexibility to choose whether or not to use the derived illumination compensation offset, that is, to choose from the following two modes of operation. The choice may be conveyed to the decoder using one or more bits, or may be implicitly conveyed without using any bits. For example, zero bits may be used by the decoder knowing, for example, when the received data corresponds to a new block, and being able to implicitly determine that the previous block had no signaling information for illumination compensation and/or color compensation.

In an embodiment, the ic_offset_i is derived by utilizing the neighboring ic_offset_j, for example averaging them. The derived ic_offset_i can then in turn be used to derive IC for blocks later in the processing order.

In another embodiment, ic_offset_i is calculated and signaled by computing the following:

$$ic\_offset\_i = \text{mean}(B(x,y) - R(x+\Delta x, y+\Delta y))$$

where B denotes the current block and R denotes the reference picture. The computed ic_offset_i could be further processed by predictive coding and/or quantization. In the case where quantization is involved, the reconstructed value ic_offset_recon_i will be used to derive illumination compensation for blocks later in the processing order; otherwise the ic_offset_i will be used.

The encoder can choose from the above two modes of operation based on certain criteria, for example rate distortion cost. The implicit illumination compensation method (option 1) might not be the best mode in terms of compensating illumination differences. However, since the implicit illumination compensation method (option 1) does not cost any extra overhead, it might be better than the explicit illumination compensation method (option 2) in terms of rate distortion trade-off.

Various implementations may be made as, for example, a process/method, an apparatus, a set of instructions, a medium for carrying instructions, and a signal. Further, the various implementations, features, and aspects described herein may be combined to form additional implementations, and features may be added, omitted, and modified. Additionally, the headings in this disclosure are in no way intended to be limiting or, for example, to limit the features described in one section to just that section.

Figure 3:
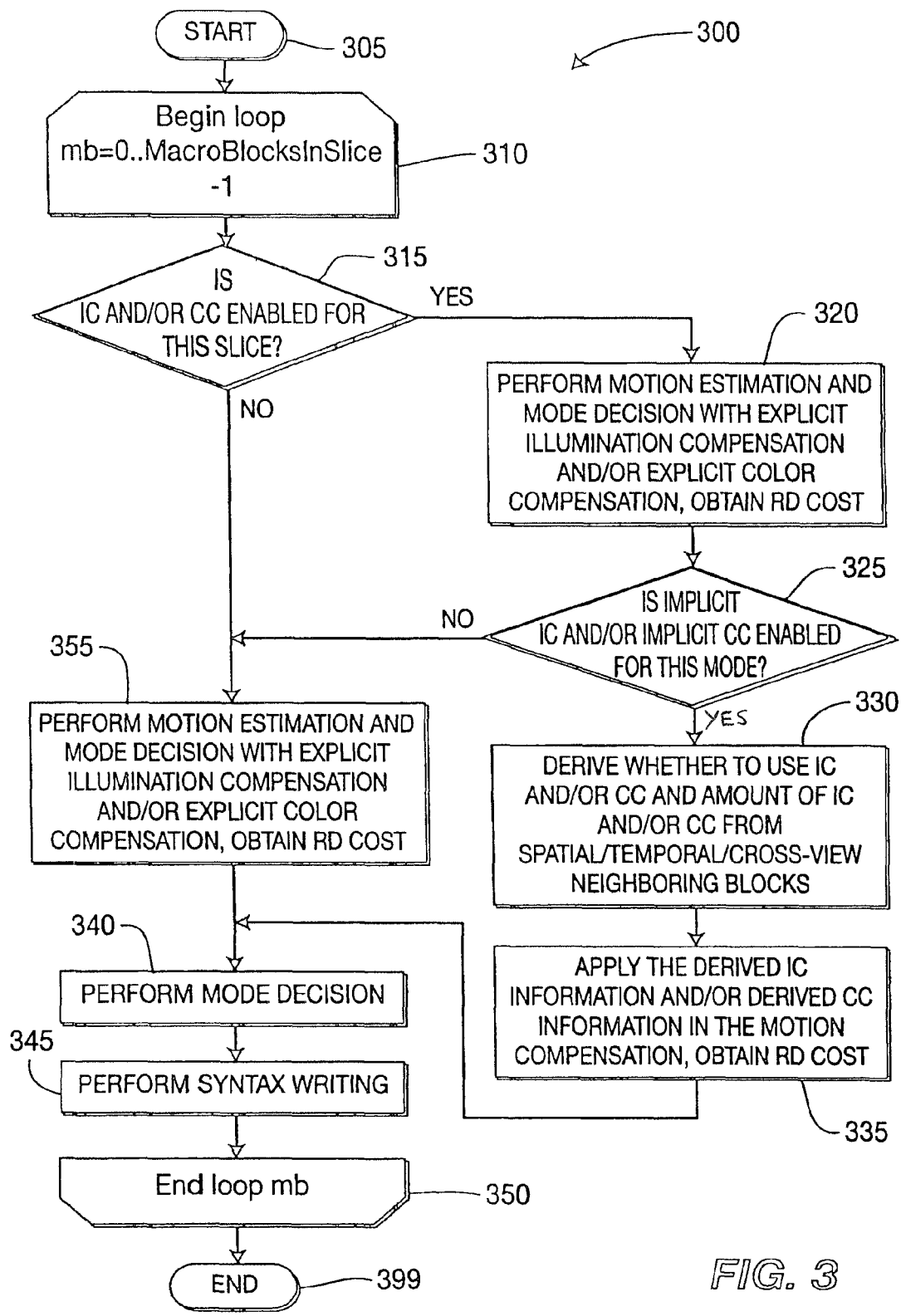
FIG. 3 is a flow diagram for an exemplary method for encoding a picture using at least one of illumination compensation and color compensation, in accordance with an embodiment of the present principles.

Turning to FIG. 3, an exemplary method for encoding a picture using at least one of illumination compensation and color compensation is indicated generally by the reference numeral 300.

The method 300 includes a start block 305 that passes control to a loop limit block 310. The loop limit block 310 performs a loop over each macroblock in a current picture, including initializing a variable mb (having a value from 0 to MacroBlocksInSlice-1), and passes control to a decision block 315. The decision block determines whether or not illumination compensation and/or color compensation are enabled for this slice. If so, then control is passed to a function block 320. Otherwise, control is passed to a function block 355.

The function block 320 performs motion estimation and mode decision with explicit illumination compensation and/or explicit color compensation, obtains the rate-distortion (RD) cost, and passes control to a decision block 325. The decision block 325 determines whether or not implicit illumination compensation and/or implicit color compensation is enabled for this mode. If so, then control is passed to a function block 330. Otherwise, control is passed to a function block 355.

The function block 330 derives whether or not to use illumination compensation and/or color compensation from spatial/temporal/cross-view neighboring blocks, and passes control to a function block 335. The function block 335 applies the derived illumination compensation information and/or color compensation information in the motion compensation, obtains the rate-distortion (RD) cost, and passes control to a function block 340. The function block 340 performs a mode decision, and passes control to a function block 345. The function block 345 performs syntax writing, and passes control to a loop limit block 350. The loop limit block 350 ends the loop over each macroblock in the current picture, and passes control to an end block 399.

The function block 355 performs motion estimation and mode decision without illumination compensation and color compensation, obtains the rate-distortion (RD) cost, and passes control to the function block 340.

Figure 4:
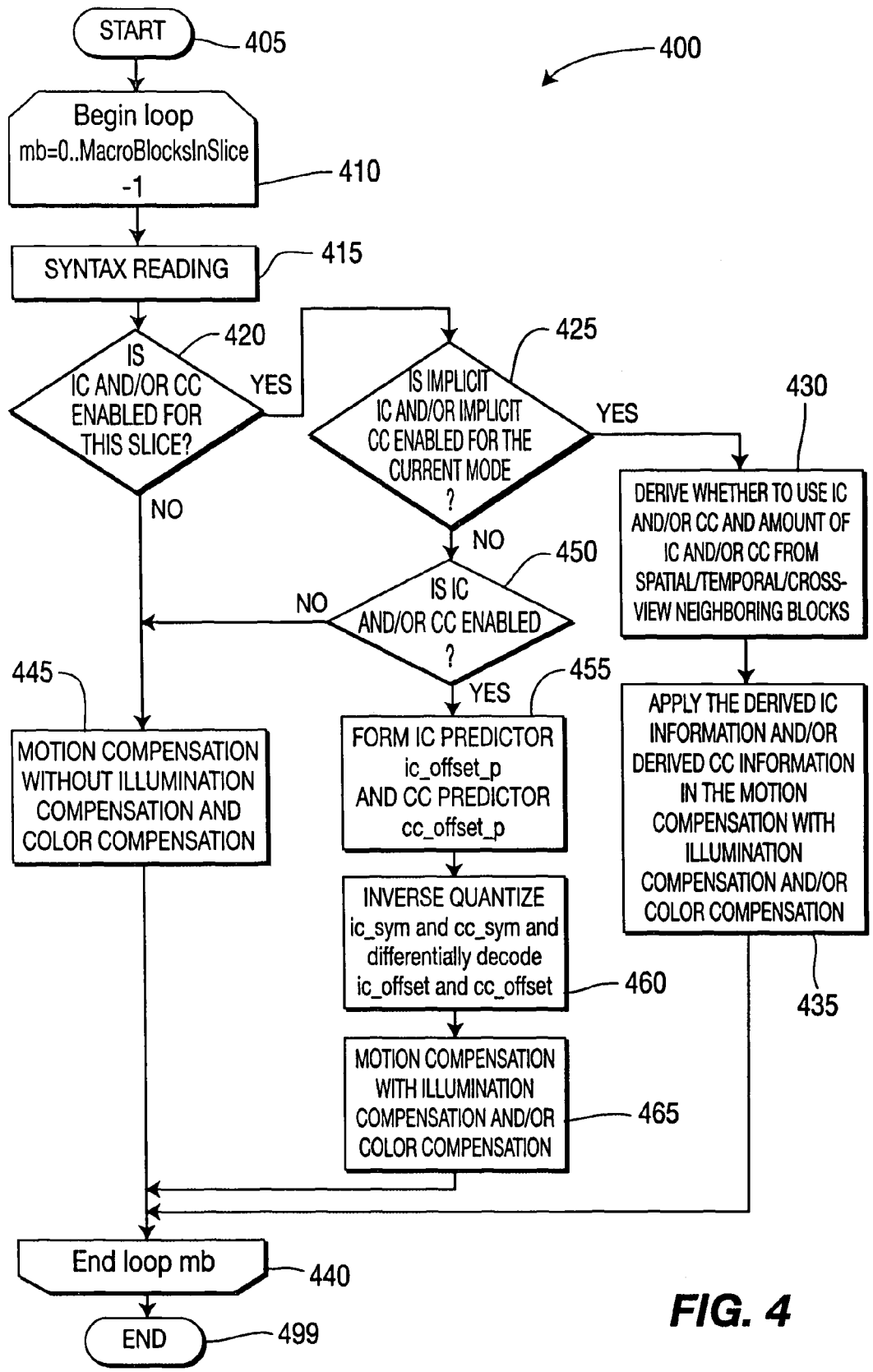
FIG. 4 is a flow diagram for an exemplary method for decoding a picture using at least one of illumination compensation and color compensation, in accordance with an embodiment of the present principles.

Turning to FIG. 4, an exemplary method for decoding a picture using at least one of illumination compensation and color compensation is indicated generally by the reference numeral 400.

The method 400 includes a start block 405 that passes control to a loop limit block 410. The loop limit block 410 performs a loop over each macroblock in the current picture, including initializing a variable mb (having a value from 0 to MacroBlocksInSlice-1), and passes control to a function block 415. The function block 415 performs syntax reading, and passes control to a decision block 420. The decision block 420 determines whether or not illumination compensation and/or color compensation are enabled for this slice. If so, then control is passed to a decision block 425. Otherwise, control is passed to a function block 445.

The decision block 425 determines whether or not implicit illumination compensation and/or implicit color compensation are enabled for the current mode. If so, then control is passed to a function block 430. Otherwise, control is passed to a decision block 450.

The function block 430 derives whether to use illumination compensation and/or color compensation from the amount of illumination compensation and color compensation, respectively, from spatial/temporal/cross-view neighboring blocks, and passes control to the function block 435. The function block 435 applies the derived illumination compensation and/or color compensation information in the motion compensation with illumination compensation and/or color compensation, and passes control to a loop limit block 440. The loop limit block 440 ends the loop over each macroblock in the current picture, and passes control to an end block 499.

The function block 445 performs motion compensation without illumination compensation and color compensation, and passes control to the loop limit block 440.

The decision block 450 determines whether or not illumination compensation and/or color compensation is enabled. If so, then control is passed to a function block 455. Otherwise, control is passed to the function block 445.

The function block 455 forms an illumination compensation predictor, ic_offset_p, and/or a color compensation predictor, cc_offset_p, and passes control to the function block 460. The function block 460 inverse quantizes ic_sym and/or cc_sym, and differentially decodes ic_offset and/or cc_offset, and passes control to a function block 465. The function block 465 performs motion compensation with illumination compensation and/or color compensation, and passes control to the loop limit block 440.

A description will now be given of some of the many attendant advantages/features of the present invention, some of which have been mentioned above. For example, one advantage/feature is an apparatus having an encoder for encoding a picture by enabling at least one of color compensation and illumination compensation of at least one color component of a prediction for an image block of the picture without using explicit signaling.

Another advantage/feature is the apparatus having the encoder as described above, wherein the picture corresponds to multi-view content for a same or similar scene, single view content, and a scalable video layer for the same scene.

Yet another advantage/feature is the apparatus having the encoder as described above, wherein the encoder enables the at least one of the color compensation and the illumination compensation based on at least one of a group of pixels and a local signal block corresponding to the picture.

Moreover, another advantage/feature is the apparatus having the encoder that enables the at least one of the color compensation and the illumination compensation based on at least one of a group of pixels and a local signal block corresponding to the picture as described above, wherein at least one of color compensation information and illumination compensation information for the at least one color component is represented as at least one of an offset and a scale factor.

Further, another advantage/feature is the apparatus having the encoder wherein at least one of color compensation information and illumination compensation information for the at least one color component is represented as at least one of an offset and a scale factor as described above, wherein the encoder uses a derivation process to derive the at least one of the color compensation information and the illumination compensation information, the derivation process using signal statistics in at least one of a spatial neighborhood, a view neighborhood, and a temporal neighborhood corresponding to the image block.

Also, another advantage/feature is the apparatus having the encoder that uses the derivation process as described above, wherein at least one of an averaging filter and a median filter is used in the derivation process.

Additionally, another advantage/feature is the apparatus having the encoder that uses the derivation process as described above, wherein the derivation process is performed in the transform domain.

Moreover, another advantage/feature is the apparatus having the encoder that uses the derivation process as described above, wherein the derivation process includes evaluating multiple reference pictures using during an encoding of at least one of the image block and neighboring image blocks with respect to the image block.

Further, another advantage/feature is the apparatus having the encoder that uses the derivation process that evaluates multiple reference pictures as described above, wherein the derivation process uses the neighboring image blocks predicted from a same reference picture from among the multiple reference pictures.

Also, another advantage/feature is the apparatus having the encoder that uses the derivation process as described above, wherein the at least one of the derived color compensation information and the derived illumination compensation information comprises an indication of whether to enable the at least one of the color compensation and the illumination compensation, and an amount of the at least one of the color compensation and the illumination compensation to be applied to the at least one color component.

Additionally, another advantage/feature is the apparatus having the encoder that uses the derivation process as described above, wherein the at least one of the derived color compensation information and the derived illumination compensation information is applied to a mode of the International Organization for Standardization/International Electrotechnical Commission (ISO/IEC) Moving Picture Experts Group-4 (MPEG-4) Part 10 Advanced Video Coding (AVC) standard/International Telecommunication Union, Telecommunication Sector (ITU-T) H.264 recommendation.

Moreover, another advantage/feature is the apparatus having the encoder that uses the derivation process as described above, wherein the at least one of the derived color compensation information and the derived illumination compensation information is applied to an existing Skip mode in the International Organization for Standardization/International Electrotechnical Commission (ISO/IEC) Moving Picture Experts Group-4 (MPEG-4) Part 10 Advanced Video Coding (AVC) standard/International Telecommunication. Union, Telecommunication Sector (ITU-T) H.264 recommendation.

Further, another advantage/feature is the apparatus having the encoder that uses the derivation process as described above, wherein the at least one of the derived color compensation information and the derived illumination compensation information is applied to an existing Direct mode in the International Organization for Standardization/International Electrotechnical Commission (ISO/IEC) Moving Picture Experts Group-4 (MPEG-4) Part 10 Advanced Video Coding (AVC) standard/International Telecommunication Union, Telecommunication Sector (ITU-T) H.264 recommendation.

Also, another advantage/feature is the apparatus having the encoder that uses the derivation process as described above, wherein the at least one of the derived color compensation information and the derived illumination compensation information is applied to the at least one color component.

Additionally, another advantage/feature is the apparatus having the encoder as described above, wherein the at least one of the color compensation and the illumination compensation is enabled using at least one of implicit signaling and explicit signaling.

Additionally, another advantage/feature is the apparatus having the encoder wherein the at least one of the color compensation and the illumination compensation is enabled using at least one of implicit signaling and explicit signaling as described above, wherein the encoder renders a decision to use at least one of the explicit signaling and the implicit signaling based on a predetermined criterion.

Additionally, another advantage/feature is the apparatus having the encoder that renders a decision to use at least one of the explicit signaling and the implicit signaling based on a predetermined criterion as described above, wherein the predetermined criterion comprises a rate distortion cost.

Moreover, an advantage/feature is an apparatus having an encoder for encoding a picture by deriving at least one of illumination compensation information and color compensation information for a region in the picture based on illumination information and color information from one or more other regions in at least one of the picture and one or more related pictures.

Further, another advantage/feature is the apparatus having the encoder as described above, wherein the region in the picture is an image block, and the one or more other regions include at least one of spatially neighboring image blocks and temporally neighboring image blocks from a same view or a different view.

Also, an advantage/feature is an apparatus having an encoder for encoding a picture by selectively determining whether to implicitly signal an enablement of at least one of illumination compensation and color compensation for at least one color component of a prediction for an image block of the picture.

Additionally, another advantage/feature is an apparatus having an encoder as described above, wherein the encoder derives at least one of illumination compensation information and color compensation information for the at least one color component of the prediction for the image block in the picture based on illumination information and color information for at least one of one or more other image blocks in the picture and one or more other image blocks in related pictures, calculates at least one of illumination compensation information and color compensation information for the at least one color component, performs a comparison of at least one of the derived illumination compensation information to the calculated illumination information and the derived color compensation information to the calculated color compensation information, and determines whether to signal the enablement of the at least one of the illumination compensation and the color compensation based on a result of the comparison.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

The invention claimed is:

1. An apparatus, comprising:
an encoder for encoding a picture by enabling at least one of color compensation and illumination compensation of at least one color component of a prediction for an image block of the picture without using explicit signaling, the at least one of the color compensation and the illumination compensation being respectively performed to compensate for color mismatches and illumination mismatches between the image block and the prediction for the image block.

2. The apparatus of claim 1, wherein at least one of color compensation information and illumination compensation information for the at least one color component is represented as at least one of an offset and a scale factor, the offset for the image block being derived from a neighboring offset of a neighboring block, the offset and the neighboring offset being at least one of a color compensation offset and an illumination compensation offset that represent respective amounts of offset.

3. The apparatus of claim 1, wherein said encoder enables the at least one of the color compensation and the illumination compensation based on at least one of a group of pixels and a local signal block corresponding to the picture.

4. The apparatus of claim 3, wherein at least one of color compensation information and illumination compensation information for the at least one color component is represented as at least one of an offset and a scale factor, the offset being at least one of a color compensation offset and an illumination compensation offset that represents an amount of offset.

5. The apparatus of claim 4, wherein said encoder uses a derivation process to derive the at least one of the color compensation information and the illumination compensation information, the derivation process using signal statistics in at least one of a spatial neighborhood, a view neighborhood, and a temporal neighborhood corresponding to the image block.

6. The apparatus of claim 5, wherein the at least one of the derived color compensation information and the derived illumination compensation information comprises an indication of whether to enable the at least one of the color compensation and the illumination compensation, and an amount of the at least one of the color compensation and the illumination compensation to be applied to the at least one color component.

7. A method, comprising:
encoding a picture by enabling at least one of color compensation and illumination compensation of at least one color component of a prediction for an image block of the picture without using explicit signaling, the at least one of the color compensation and the illumination compensation being respectively performed to compensate for color mismatches and illumination mismatches between the image block and the prediction for the image block.

8. The method of claim 7, wherein at least one of color compensation information and illumination compensation information for the at least one color component is represented as at least one of an offset and a scale factor, the offset for the image block being derived from a neighboring offset of a neighboring block, the offset and the neighboring offset being at least one of a color compensation offset and an illumination compensation offset that represent respective amounts of offset.

9. The method of claim 7, wherein said enabling step enables the at least one of the color compensation and the illumination compensation based on at least one of a group of pixels and a local signal block corresponding to the picture.

10. The method of claim 9, wherein at least one of color compensation information and illumination compensation information for the at least one color component is represented as at least one of an offset and a scale factor, the offset being at least one of a color compensation offset and an illumination compensation offset that represents an amount of offset.

11. The method of claim 10, where said enabling step uses a derivation process to derive the at least one of the color compensation information and the illumination compensation information, the derivation process using signal statistics in at least one of a spatial neighborhood, a view neighborhood, and a temporal neighborhood corresponding to the image block.

12. The method of claim 11, wherein the at least one of the derived color compensation information and the derived illumination compensation information comprises an indication of whether to enable the at least one of the color compensation and the illumination compensation, and an amount of the at least one of the color compensation and the illumination compensation to be applied to the at least one color component.

13. An apparatus, comprising:
a decoder for decoding a picture by enabling at least one of color compensation and illumination compensation of at least one color component of a prediction for an image block of the picture without receipt of any explicit signaling corresponding thereto, the at least one of the color compensation and the illumination compensation being respectively performed to compensate for color mismatches and illumination mismatches between the image block and the prediction for the image block.

14. The apparatus of claim 13, wherein at least one of color compensation information and illumination compensation information for the at least one color component is represented as at least one of an offset and a scale factor, the offset for the image block being derived from a neighboring offset of a neighboring block, the offset and the neighboring offset being at least one of a color compensation offset and an illumination compensation offset that represent respective amounts of offset.

15. The apparatus of claim 13, wherein said decoder enables the at least one of the color compensation and the illumination compensation based on at least one of a group of pixels and a local signal block corresponding to the picture.

16. The apparatus of claim 15, wherein at least one of color compensation information and illumination compensation information for the at least one color component is represented as at least one of an offset and a scale factor, the offset being at least one of a color compensation offset and an illumination compensation offset that represents an amount of offset.

17. The apparatus of claim 16, where said decoder uses a derivation process to derive the at least one of the color compensation information and the illumination compensation information, the derivation process using signal statistics in at least one of a spatial neighborhood, a view neighborhood, and a temporal neighborhood corresponding to the image block.

18. The apparatus of claim 17, wherein the at least one of the derived color compensation information and the derived illumination compensation information comprises an indication of whether to enable the at least one of the color compensation and the illumination compensation, and an amount of the at least one of the color compensation and the illumination compensation to be applied to the at least one color component.

19. A method, comprising:
decoding a picture by enabling at least one of color compensation and illumination compensation of at least one color component of a prediction for an image block of the picture without receipt of any explicit signaling corresponding thereto, the at least one of the color compensation and the illumination compensation being respectively performed to compensate for color mismatches and illumination mismatches between the image block and the prediction for the image block.

20. The method of claim 19, wherein at least one of color compensation information and illumination compensation information for the at least one color component is represented as at least one of an offset and a scale factor, the offset for the image block being derived from a neighboring offset of a neighboring block, the offset and the neighboring offset being at least one of a color compensation offset and an illumination compensation offset that represent respective amounts of offset.

21. The method of claim 19, wherein said enabling step enables the at least one of the color compensation and the illumination compensation based on at least one of a group of pixels and a local signal block corresponding to the picture.

22. The method of claim 21, wherein at least one of color compensation information and illumination compensation information for the at least one color component is represented as at least one of an offset and a scale factor, the offset being at least one of a color compensation offset and an illumination compensation offset that represents an amount of offset.

23. The method of claim 22, where said enabling step uses a derivation process to derive the at least one of the color compensation information and the illumination compensation information, the derivation process using signal statistics in at least one of a spatial neighborhood, a view neighborhood, and a temporal neighborhood corresponding to the image block.

24. The method of claim 23, wherein the at least one of the derived color compensation information and the derived illumination compensation information comprises an indication of whether to enable the at least one of the color compensation and the illumination compensation, and an amount of the at least one of the color compensation and the illumination compensation to be applied to the at least one color component.

25. A non-transitory storage media having video signal data encoded thereupon, comprising:
a picture encoded by enabling at least one of color compensation and illumination compensation of at least one color component of a prediction for an image block of the picture without the use of explicit signaling, the at least one of the color compensation and the illumination compensation being respectively performed to compensate for color mismatches and illumination mismatches between the image block and the prediction for the image block.

26. The non-transitory storage media of claim 25, wherein at least one of color compensation information and illumination compensation information for the at least one color component is represented as at least one of an offset and a scale factor, the offset for the image block being derived from a neighboring offset of a neighboring block, the offset and the neighboring offset being at least one of a color compensation offset and an illumination compensation offset that represent respective amounts of offset.

27. The storage media of claim 25, wherein said video signal data enabling the at least one of the color compensation and the illumination compensation is based on at least one of a group of pixels and a local signal block corresponding to the picture.

28. The storage media of claim 27, wherein at least one of color compensation information and illumination compensation information for the at least one color component is represented as at least one of an offset and a scale factor, the offset being least one of a color compensation offset and an illumination compensation offset that represents an amount of offset.

29. The storage media of claim 28, wherein the at least one of the color compensation information and the illumination compensation information is derived; the derivation process using signal statistics in at least one of a spatial neighborhood, a view neighborhood, and a temporal neighborhood corresponding to the image block.

30. The storage media of claim 29, wherein the at least one of the derived color compensation information and the derived illumination compensation information comprises an indication of whether to enable the at least one of the color compensation and the illumination compensation, and an amount of the at least one of the color compensation and the illumination compensation to be applied to the at least one color component.

* * * * *